Aug. 1, 1961  C. VAN DER LELY ET AL  2,994,179
ROTARY SIDE DELIVERY RAKE WITH AN ADJUSTABLY
MOUNTED RAKING WHEEL
Filed Sept. 30, 1957  4 Sheets–Sheet 4

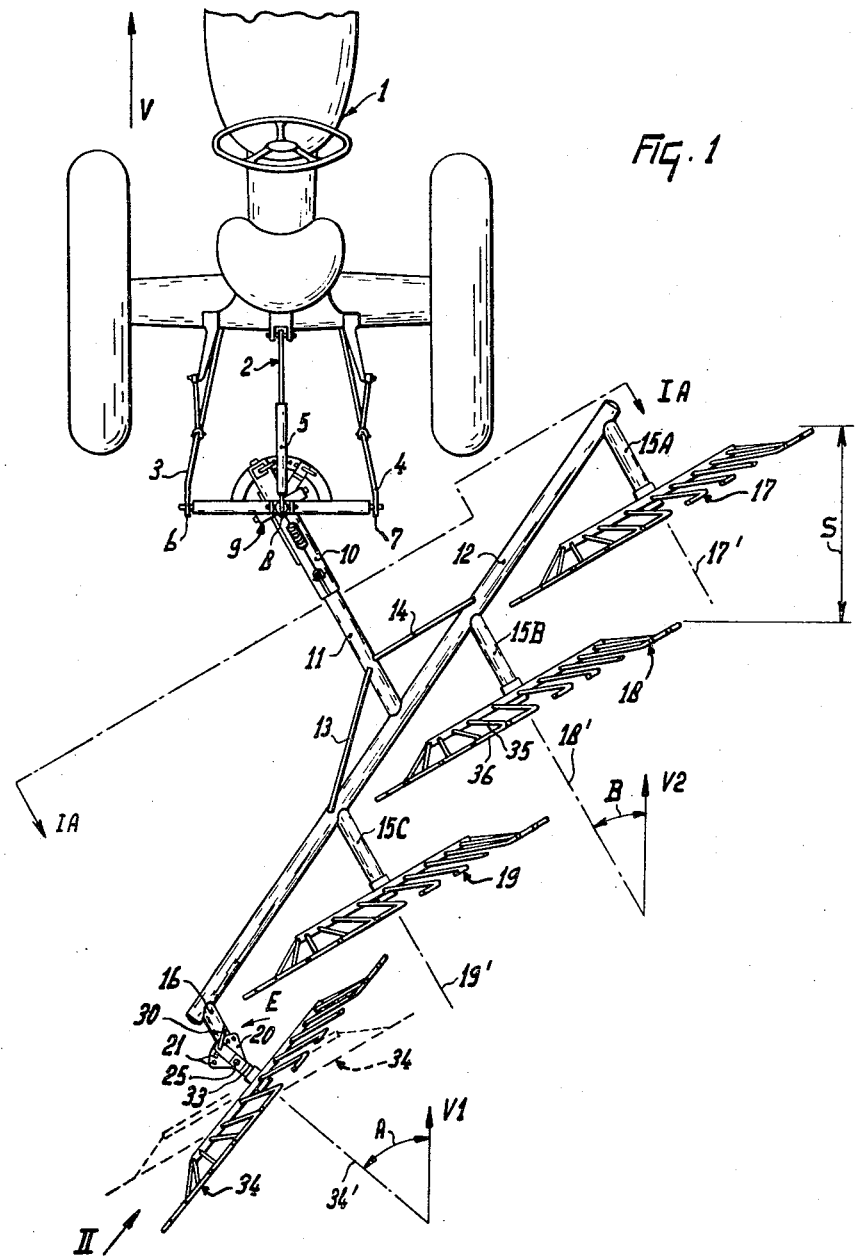

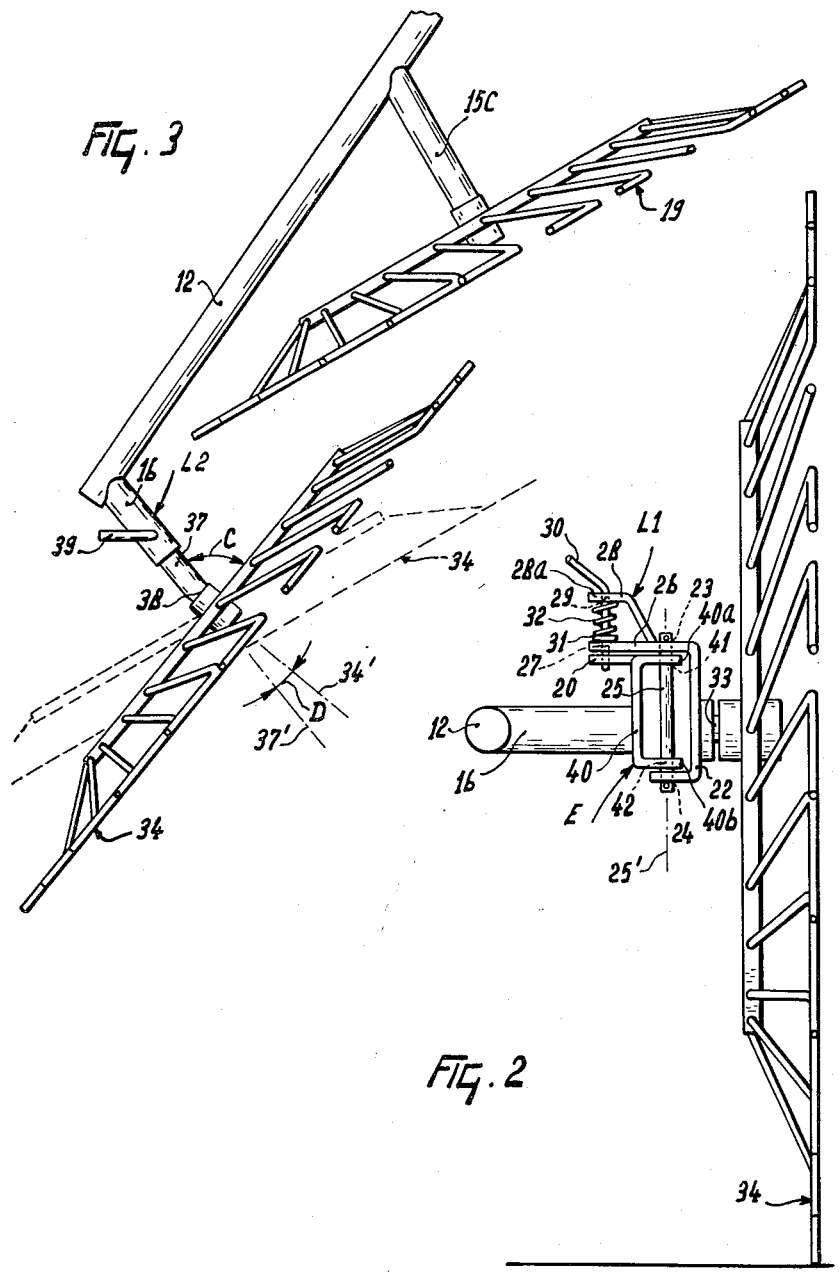

United States Patent Office

2,994,179
Patented Aug. 1, 1961

2,994,179
ROTARY SIDE DELIVERY RAKE WITH AN ADJUSTABLY MOUNTED RAKING WHEEL
Cornelis van der Lely and Ary van der Lely, Maasland, Netherlands, assignors to C. van der Lely, N.V., Maasland, Netherlands, a limited company of the Netherlands
Filed Sept. 30, 1957, Ser. No. 686,923
Claims priority, application Netherlands Sept. 29, 1956
7 Claims. (Cl. 56—377)

This invention relates to devices for laterally displacing material lying on the ground, and more particularly to devices of the kind including a frame on which is mounted a row of overlapping rake wheels which are arranged to move material to one side and which are disposed obliquely to an intended direction of travel.

Devices of the type set forth above are generally known and some of these may be employed to displace material lying on the ground so as to form the same into a windrow. Known windrow forming devices have the disadvantage that, under certain conditions, the windrow formed does not have a constant width or height and, if the material accumulated in a windrow is subsequently to be worked by a chaff cutting machine or a baler, it is a great disadvantage for the windrow to be of irregular shape, since such machines are only capable of dealing with windrows of a given size. If windrows have accumlations of extremely large size, such machines are overloaded resulting in clogging and other undesirable consequences.

An object of the invention is to obviate the disadvantage noted above and to provide a device for improving formed windrows. To this end, in accordance with the invention, there is provided a device wherein, considered in plan view, the angle between the axis of rotation of the rearmost rake wheel and the intended direction of travel is larger than the angle between the axis of rotation of at least one of the remaining rake wheels and the intended direction of travel.

A device according to the invention is capable of forming a windrow of uniform width and height, which windrow may, if desired, be slightly narrower than would be the case if the rearmost rake wheel did not occupy its different position.

In one embodiment of the invention, the axes of rotation of the rake wheels, with the exception of the axis of rotation of the rearmost rake wheel, are co-planar. This axis of the rearmost rake wheel intersects the plane in which lie the axes of the remaining rake wheels. This permits the plane of the rearmost rake wheel to be inclined at a different angle to the ground than the planes of the remaining rake wheels, this arrangement being desirable with certain crops to make a uniform windrow.

Preferably, the angle between the rearmost rake wheel and the intended direction of travel is variable so that the position of the rearmost rake wheel can be adjusted to suit the crop to be worked.

The rearmost rake wheel may be rotatable about a vertical pivot shaft, which extends parallel to the plane of the rake wheel, so that the rake wheel can be adjusted in a simple manner. The pivot shaft can be positioned at a higher level than the axis of the rearmost rake wheel, so that large windrows cannot come into contact with the shaft.

However, the axis of the pivot shaft and the axis of the rearmost rake wheel may lie in one plane and may be at an angle to one another so that it is possible to vary, in a simple manner, the angle between the rearmost rake wheel and the intended direction of travel.

For a better understanding of the invention and to illustrate embodiments thereof, reference will next be made to the accompanying drawings, in which:

FIGURE 1 is a plan view of a device for laterally displacing material lying on the ground.

FIGURE 2 is an elevational view, on an enlarged scale, of part of the device shown in FIGURE 1, the elevation being taken in the direction of the arrow II of FIGURE 1.

FIGURE 3 is a plan view, on an enlarged scale, of a modification of part of the device shown in FIGURE 1.

Figure 1A:
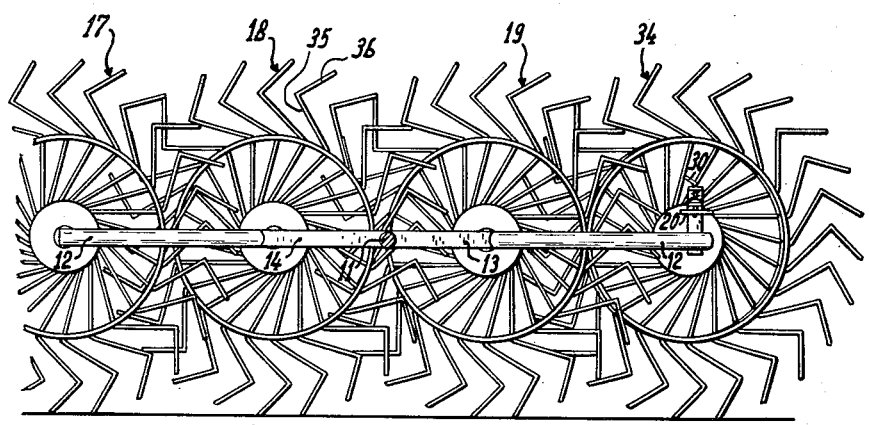
FIGURE 1a is a sectional view taken along line 1A—1A in FIG. 1.

In FIGURES 1, 1a and 2, there is shown a device for laterally displacing material lying on the ground. The device can be connected to a conventional tractor 1, of which only the rear part is shown. The tractor 1 has a conventional lifting device 2 including arms 3, 4 and 5, to the rear ends 6, 7 and 8 of which is secured a supporting structure or means 9. The supporting structure 9 includes a tube 10 which constitutes a bearing for a shaft 11, and a tubular frame member or frame 12 is welded or conventionally secured to the rear end of the shaft 11, stay rods 13 and 14 being provided for reinforcing the connection between the shaft 11 and the frame member 12.

The frame 12 is provided with supports or axle means 15A, 15B, 15C and 16. The supports 15A, 15B and 15C carry rake wheels 17, 18 and 19 (which are spaced by, for example, a distance S considered in the direction of travel V), the rake wheels having axes of rotation 17', 18' and 19' and each being mounted for rotation about the center line of its respective support which coincides with one of the aforesaid axes of rotation. A strip 40 (see FIG. 2) is secured to the support 16, and the ends 40a and 40b of the strip 40 are curved and formed with holes 41 and 42. These elements are parts of a coupling device E which couples rake wheel 34 to frame 12. The strip 40 is provided at its upper portion with a sector-shaped plate or segment 20, in which holes or apertures 21 are formed.

A strip or section 22, similar to the strip or section 40, has holes or apertures 23 and 24 formed in its ends, and the ends of the strip 22 are arranged adjacent the ends of the strip 40 with the holes 23 and 24 in register with the holes 41 and 42. A vertical pivot or shaft 25 defining a vertical axis 25' is passed through the holes 41, 42, 23 and 24, the strip 22 thereby being linked to the strip 40 so as to be pivotable about the shaft 25. An extension or arm member 26 is welded or otherwise conventionally secured to the upper end of the strip 22, a hole 27 being formed in the extension 26. An extension 28 is secured to the top of the extension 26, a hole or aperture 29 being formed in the free end 28a of the extension 28. A locking pin 30 is passed through the holes 27 and 29, the pin 30 being provided with a ring 31 disposed so as to lie between the extensions 26 and 28 and the pin 30 being surrounded by a spring 32 also disposed between the ring 31 and the extension 28. The locking pin 30 can be placed in one of the holes 21 in the segment 20 so that the strip 22 can be prevented from rotating about the shaft 25. The strip 22 carries a shaft 33 about which a rake wheel 34 is rotatable relative to its axis of rotation 34'.

The rake wheels 17, 18, 19 and 34 (having planes of rotation P17, P18, P19 and P34) are of identical construction and, as is shown for the rake wheel 18, they are provided with supporting members 35, the free ends of which are bent to form tines 36 which extend backwards relative to the intended direction of rotation of the rake wheels.

In the operation of the device shown in FIGURES 1 and 2, the tractor 1 moves the device in the direction of the arrow V (also V2, V2), and the rake wheels, being oblique to the direction of travel V, are rotated by coming into contact with the ground so that crop engaged by the rake wheels is laterally displaced. The rake wheel 17 will deliver the crop to the rake wheel 18 which delivers it to the rake wheel 19, which, in turn, delivers the crop to the rake wheel 34 which further displaces the crop in the same general direction and leaves the crop behind at the side of the device in the form of a windrow.

Because of the arrangement of the rake wheel 34, the shaft 33 which is at a larger angle A to the direction of travel V1 than the angle B of the shafts of the rake wheels 17, 18 and 19, and the crop is displaced laterally by the rake wheel 34 to a smaller extent than is caused by each of the rake wheels 17, 18 and 19. Thus a windrow is formed which is narrower than would be the case if the angle of the rake wheel 34 were the same as that of the rake wheels 17 to 19, and which has a uniform width and a uniform height throughout its length. For particular operations on crop such as, for example, tedding, it may be desirable for the axis of rotation of the rake wheel 34 to lie at the same angle to the direction of travel V as the axes of rotation of the rake wheels 17, 18 and 19 and to enable disposing the rake wheel 34 in this manner, the rake wheel 34 is made rotatable about the shaft 25.

In order to move the rake wheel 34 from the initial position 34A (see FIG. 2) into the position 34B, wherein the plane of the rake wheel 34 lies parallel to the planes of the rake wheels 17, 18 and 19, the locking device or means L1 includes a locking pin 30 which is removed from one of the holes 21 so that the rake wheel can be turned about the shaft 25 to the position 34B. The locking pin 30 is placed into the corresponding hole 21 so that the rake wheel 34 is prevented from rotating about the shaft 25. The position 34B of the rake wheel is advantageous when a windrow is to be turned to facilitate drying. When the rake wheel 34 is in the position 34B a broader windrow is formed (than when the rake wheel 34 is in the position 34A) so that a swath or windrow can be dried more efficiently.

Figure 4:
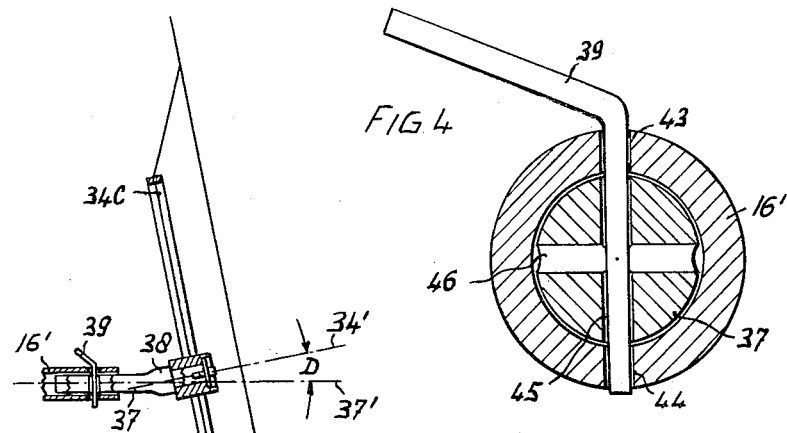
FIGURE 4 is an enlarged sectional view along line IV—IV in FIGURE 3.
Figure 5:
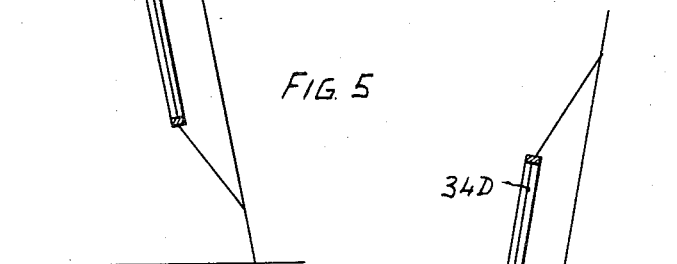
FIGURE 5 is an elevational view, on an enlarged scale, of part of the device shown in FIGURE 1, the elevation being taken in the direction of the arrow II of FIGURE 1, but wherein the rake wheel has an inclined position.
Figure 6:
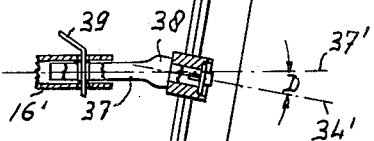
FIGURE 6 is an elevation as shown in FIGURE 5, but wherein the rake wheel has a different inclined position.

In FIGURE 3, there is shown a plan view of a modification of the device shown in FIGURE 1, and in FIGURE 3 corresponding parts are designated by the same reference numerals. The rearmost rake wheel 34 is connected to the support sleeve 16' which constitutes a bearing for a pivot shaft 37, the end 38 of the shaft 37 being bent through a small angle D to form an end or stub-axle 38 for the rake wheel 34. The shaft 37 is prevented from moving axially and from rotating in the bearing 16 by means of a locking device or means L2 including locking pin 39, which passes through holes formed in the bearing 16 and in the shaft 37. The rake wheel 34 can be moved from the position 34A into the position 34B by removing the locking pin 39 and by turning the shaft 37 through 180°, and then locking the shaft 37 relative to the bearing 16. This change of the rake wheel 34 from the position 34A into the position 34B by turning the shaft 37 is rendered possible, since the center line or axis of rotation 37' of the shaft 37 and the axis of rotation 34' of the rake wheel 34, which is constituted by the center line of the end 38 of the shaft 37, are at the angle D to one another, the plane of rotation P of rake wheel 34 defining an angle C with the axis of rotation 37'. With this construction the shaft 37 can be turned through an angle which is smaller than 180°. Then the rake wheel 34 will occupy a position, in which the plane of the rake wheel 34 is inclined to the vertical, as is shown in FIGURES 5 and 6. By forming a hole 46 in the shaft 37 (see FIG. 4), the rake wheel 34 can be locked in two positions, in which the plane of this rake wheel is inclined to the vertical by introducing the locking pin 39 into said hole from one of the sides. The position shown in FIGURE 6 can be obtained by turning the shaft 37 from the position shown in FIGURE 5.

The device shown in the drawings can be moved from the position shown in FIGURE 1, in which the rake wheels 17, 18, 19 and 34 deliver the crop to the same side, into a second position by turning the shaft 11 in the bearing 10 through 180°. Then the device will occupy a position in which each rake wheel delivers separately the crop lying on the ground to one side, the crop moved by one rake wheel being out of the range of operation of further rake wheels so that the device operates as a tedder. In the new position the rake wheel 34 is the foremost rake wheel, viewed in the intended direction of travel of the device, whereas the rake wheel 17 is the rearmost rake wheel. For this position of the device it is also important for the rake wheel 34 to be movable into a position, in which its plane is parallel to the planes of the rake wheels 17, 18 and 19.

There will now be obvious to those skilled in the art, many modifications and variations of the embodiments set forth but within the spirit of the inventor as defined in the following claims.

What we claim is:

1. An agricultural implement having a normal direction of travel and comprising a frame, a first rake wheel on said frame and inclined relative to said direction for laterally displacing material lying on the ground, a second rake wheel, and means operatively associated with said frame and second rake wheel and supporting the second rake wheel on the frame at an acute angle with respect to said first rake wheel, said rake wheels being operatively associated such that material displaced by said first rake wheel is further displaced in the same general direction by said second rake wheel.

2. An implement as claimed in claim 1, wherein said second wheel is inclined at a greater angle with respect to said direction of travel than is said first wheel.

3. An implement as claimed in claim 1, wherein said means enables adjustment of the angle between said rake wheels.

4. An implement as claimed in claim 1, wherein said means includes a vertical pivot supported on said frame, said second rake wheel being operatively associated with and displaceable about said pivot.

5. An implement as claimed in claim 4, comprising means operatively associated with said frame, pivot and second rake wheel, to fix the latter relatively to said frame.

6. An implement as claimed in claim 1, wherein said means includes a shaft rotatably supported on said frame and in turn including an inclined stub-shaft supporting said second rake wheel.

7. An implement as claimed in claim 1, wherein said second rake wheel is inclined to the vertical.

References Cited in the file of this patent

UNITED STATES PATENTS

| | | |
|---|---|---|
| 2,459,961 | Pollard | Jan. 25, 1949 |
| 2,689,446 | Sorrels | Sept. 21, 1954 |
| 2,727,351 | Plant | Dec. 20, 1955 |
| 2,811,009 | Plant | Oct. 29, 1957 |
| 2,819,578 | Wuster | Jan. 14, 1958 |

FOREIGN PATENTS

| | | |
|---|---|---|
| 512,929 | Belgium | Mar. 5, 1954 |
| 1,121,996 | France | May 14, 1956 |